US009348317B2

(12) United States Patent
Willemin et al.

(10) Patent No.: US 9,348,317 B2

(45) Date of Patent: May 24, 2016

(54) METHOD OF MEASURING THE ACCURACY OF A MECHANICAL WATCH

(75) Inventors: Michel Willemin, Preles (CH); Cedric Decosterd, Bienne (CH); Thierry Hessler, St-Aubin (CH); Thierry Conus, Lengnau (CH)

(73) Assignee: The Swatch Group Research and Development Ltd., Marin (CH)

( * ) Notice: Subject to any disclaimer, the term of this patent is extended or adjusted under 35 U.S.C. 154(b) by 392 days.

(21) Appl. No.: 13/885,558

(22) PCT Filed: Nov. 22, 2011

(86) PCT No.: PCT/EP2011/070625

§ 371 (c)(1),
(2), (4) Date: Aug. 28, 2013

(87) PCT Pub. No.: WO2012/069444

PCT Pub. Date: May 31, 2012

(65) Prior Publication Data

US 2013/0329040 A1 Dec. 12, 2013

(30) Foreign Application Priority Data

Nov. 26, 2010 (EP) .................................... 10192725

(51) Int. Cl.
*H04N 7/18* (2006.01)
*G04D 7/00* (2006.01)

(52) U.S. Cl.
CPC .................................... *G04D 7/004* (2013.01)

(58) Field of Classification Search
USPC .......................................................... 348/143
See application file for complete search history.

(56) References Cited

U.S. PATENT DOCUMENTS 3,579,976 A * 5/1971 D'Muhala ................ G04G 9/04 340/309.16
3,609,579 A * 9/1971 Chappell .................. G04F 5/00 331/2
3,864,957 A * 2/1975 Fujita ..................... G04F 10/04 73/1.48
4,058,970 A * 11/1977 Ichinose ................ G04G 17/04 349/150
4,106,280 A * 8/1978 Schulz ................. G04C 11/084 324/76.52

(Continued)

FOREIGN PATENT DOCUMENTS

EP 1 553 469 A1 7/2005

OTHER PUBLICATIONS

International Search Report issued Feb. 14, 2012 in PCT/EP2011/070625.

(Continued)

*Primary Examiner* — Leron Beck
(74) *Attorney, Agent, or Firm* — Oblon, McClelland, Maier & Neustadt, L.L.P.

(57) ABSTRACT

A method of measuring accuracy of a watch including a visual display device, including: storing a first instant, at which the display is in a first display position corresponding to a first image, with a corresponding time reference source; determining a first display value for the first image and stored in a storage in correlation with the first instant; storing, after a determined time interval, a second instant, at which the display is in a second display position corresponding to a second image, with the corresponding source; determining a second display value for the second image and stored in the storage in correlation with the second instant; and calculating displaying on a viewing device the variation in rate of the display.

14 Claims, 2 Drawing Sheets

(56) References Cited

U.S. PATENT DOCUMENTS

| | | | | | |
|---|---|---|---|---|---|
| 4,211,066 | A * | 7/1980 | Kusumoto | G04C 3/146 | 368/101 |
| 4,313,186 | A * | 1/1982 | Yoshida | G04G 9/0076 | 368/22 |
| 4,615,185 | A * | 10/1986 | Bollinger | A44C 5/0053 | 224/164 |
| 2005/0105401 | A1 * | 5/2005 | Akahane | G04C 9/02 | 368/187 |
| 2005/0151849 | A1 * | 7/2005 | Fitzhugh | G04G 5/00 | 348/207.99 |

OTHER PUBLICATIONS

Controle Officiel Suisse des Chronometres COSC [CH]: "Les Methodes de Mesure du COSC", XP-002631514, Jun. 20, 2006, Retrieved from the Internet: URL:http://www.cosc.ch/methode2.php?lang=fr.

Alan Downing: "Inside COSC", XP-002631515, 2002, Retrieved from the Internet: URL:http://www.timezone.com/library/wbore/wbore631733384647656250.

Michael Disher: "An Overview of the COSC Certificate and Testing Procedures", XP-02631516, Feb. 12, 2000, Retrieved from the Internet: URL:http://forums.timezone.com/index.php?t=tree&goto=1555&rid=2.

* cited by examiner

METHOD OF MEASURING THE ACCURACY OF A MECHANICAL WATCH

CROSS-REFERENCE TO RELATED APPLICATIONS

This is a National Phase Application in the United States of International Patent Application PCT/EP2011/070625 filed Nov. 22, 2011, which claims priority on European Patent Application No. 10192725.9 of Nov. 26, 2010. The entire disclosures of the above patent applications are hereby incorporated herein by reference.

FIELD OF THE INVENTION

The invention concerns a method of measuring the accuracy of at least one timepiece, particularly a mechanical watch, comprising at least one visual display device.

The invention also concerns a device for implementing this method.

The invention concerns the field of horology, and devices for checking the operating performance of timepieces.

BACKGROUND OF THE INVENTION

It is often difficult for a user to evaluate the proper operation of a timepiece, and in particular its time drift, known as "variation in rate". The user has to rely upon the manufacturer in order to know the features of his watch or timepiece.

The performance of a timepiece may degenerate over time, particularly for reasons of lubrication, or due to wear in extreme conditions.

Software has appeared on the market for measuring the instantaneous rate of a mechanical watch, the principle of which consists in measuring ticking with the microphone of a mobile telephone and deducing therefrom the oscillation frequency and thus the rate of the watch, which provides an estimate of its variation in rate. However, the accuracy of this type of system is still not very good, i.e. around 5 seconds per day, and it is complex to use since it is impossible to detect the signal if there is ambient background noise.

Although providing an alternative to the professional laboratory means used to date, this software is therefore too limited.

SUMMARY OF THE INVENTION

The invention proposes to overcome the limitations of the prior art.

The invention therefore concerns a method of measuring the accuracy of at least one timepiece, particularly a mechanical watch, comprising at least one visual display device, characterized in that:

- one of said at least one visual display devices of said timepiece is selected as the experimental display;
- a first measured instant, at which said display is in a first display position corresponding to a first image, is stored with a corresponding internal or external time reference source. A first display value, corresponding to said first image, is determined and said first display value is stored in a memory in correlation with said first instant;
- after a determined time interval following said first instant, a second measured instant, at which said display is in a second display position corresponding to a second image, is stored with said corresponding time reference source. A second display value corresponding to said second image is determined and said second display value is stored in said memory in correlation with said second instant;
- the time difference displayed between said second display value and said first display value is calculated;
- the variation in rate of said experimental display is calculated, and said variation in rate is displayed on a viewing means.

In a particular implementation of this method:

- one of said at least one visual display devices of said timepiece is selected as the experimental display;
- a first photograph is shot at a first instant with a camera, coupled to an internal or external time reference source and provided with a storage means for storing a first image resulting from said first shot, which is processed, using an image analyser, to determine a first display value stored in a memory in correlation with the time reference point of said first instant provided by said time reference source;
- after a determined time interval following said first shot, a second photograph is shot at a second instant on the same experimental display with the same camera coupled to the same time reference source and provided with the same storage means for storing a second image resulting from said second shot which is processed, using said image analyser, to determine a second display value stored in a memory in correlation with the time reference point of said second instant provided by said time reference source;
- the time difference displayed between said second display value and said first display value is calculated;
- the variation in rate of said experimental display is calculated, and said variation in rate is displayed on a viewing means.

The invention also concerns a device for implementing this method, characterized in that it includes:

- a time reference source, formed by an internal time reference source, or by a receiving and processing means arranged to receive and process signals transmitted by an external time source to permanently update a repeater clock internal to said device;
- a calculating means arranged to calculate time differences between display values, and/or between time reference points provided by said time reference source, and to calculate a variation in rate;
- another data processing unit arranged to store and process at least one variation in rate calculated by said calculating means, and/or a viewing means arranged to display at least one variation in rate calculated by said calculating means.

According to a feature of the invention, said device includes:

- a means of shooting photographs and/or video;
- a time reference source, formed by an internal time reference source, or by a receiving and processing means arranged to receive and process signals transmitted by an external time source to permanently update a repeater clock internal to said device;
- said means of shooting photographs and/or video being coupled to said time reference source;
- a storage means for storing images resulting from shots and the time reference points of the instants at which said shots are taken, said time reference points being supplied by said time reference source;
- an image analysis hardware and/or software means, for determining;

the position in space of visible indicators in each shot taken;

and/or a time display value in each shot taken;

a calculating means arranged to calculate time differences between display values provided by said image analysis means, and/or between time reference points provided by said time reference source and for calculating a variation in rate;

another data processing unit arranged to store and process at least one variation in rate calculated by said calculating means, and/or a viewing means arranged to display at least one variation in rate calculated by said calculating means.

According to a feature of the invention, this device is formed by a mobile telephone or an iPhone® or a smartphone coupled to an internal or external time reference source.

BRIEF DESCRIPTION OF THE DRAWINGS

Other features and advantages of the invention will appear upon reading the following detailed description, with reference to the annexed drawings, in which.

DETAILED DESCRIPTION OF PREFERRED EMBODIMENTS

Figure 1:
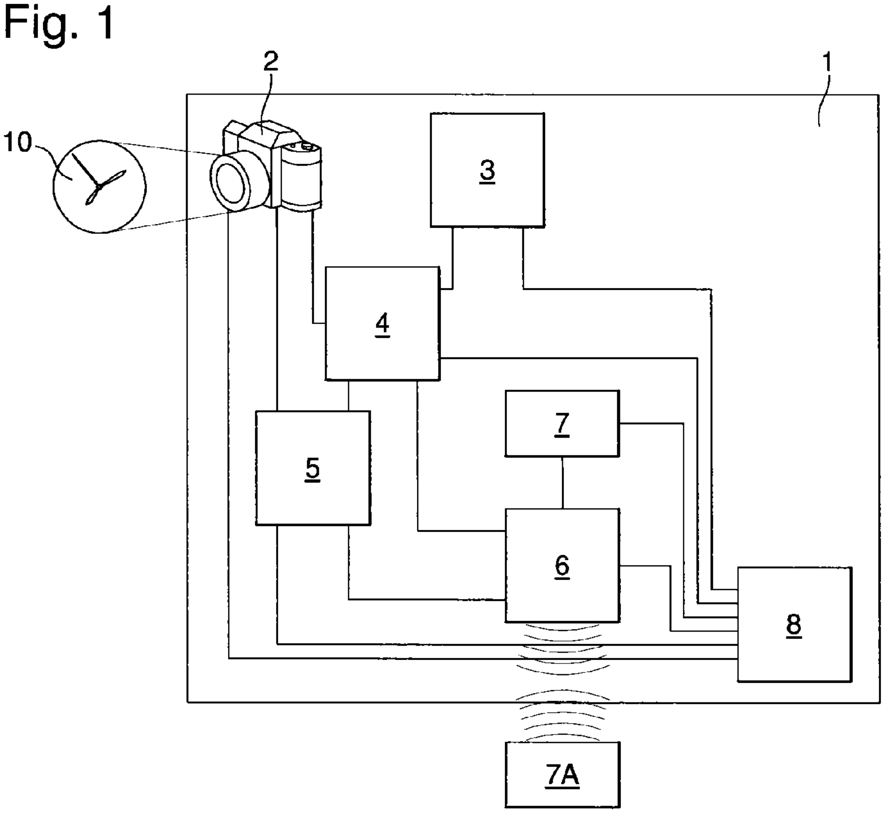
FIG. 1 shows a schematic view of a device for implementing the invention facing a timepiece at a first instant.

The invention concerns the field of horology, and devices for checking the operating performance of timepieces.

The invention concerns a method of measuring the accuracy of at least one timepiece, particularly a mechanical watch, comprising at least one visual display device.

According to the invention, the method includes the following steps:

one of said at least one visual display devices of said timepiece is selected as the experimental display, for example a seconds hand, or a set of three hour, minute and seconds hands, as seen in the Figures;

a first measured instant, at which said display is in a first display position corresponding to a first image, is stored with a corresponding internal or external time reference source. A first display value, corresponding to said first image, is determined and said first display value is stored in a memory in correlation with said first instant;

after a determined time interval following said first instant, a second measured instant, at which said display is in a second display position corresponding to a second image, is stored with said corresponding time reference source. A second display value corresponding to said second image is determined and said second display value is stored in said memory in correlation with said second instant;

the time difference displayed between said second display value and said first display value is calculated;

the variation in rate of said experimental display is calculated, and said variation in rate is displayed on a viewing means.

In a particular implementation:

a first instant is stored, at which said display is in a first display position synchronised, in optical comparison to the time display position of the timepiece, with a first image supplied at the request of the user, who may alter the position of said image as desired to synchronise said image with the real timepiece display, said first image being generated by an image generator coupled to an internal or external time reference source, a second instant is stored, at which said display is in a second display position synchronised, in optical comparison to the time display position of the timepiece, with a second image supplied at the request of the user, who may alter the position of said image as desired to synchronise said image with the real timepiece display, said second image being generated by the same image generator.

In a variant in which no particular attention is required from the user when shots are taken:

a first photograph is shot at a first instant with a camera coupled to an internal or external time reference source and provided with a storage means for storing a first image resulting from the first shot and the time reference point of the first instant provided by the time reference source;

the user superposes a first image generated by an image generator on the image of said first photograph, said first image being provided at the request of the user, who may change the position thereof as desired to make said first image similar to said image of said first photograph. Said first display value corresponding to said first image is determined and the first display value is stored in said memory in correlation with said first instant;

after a determined time interval following said first shot, a second photograph is shot at a second instant on the same said experimental display with the same camera coupled to the same time reference source and provided with the same storage means for storing a second image resulting from said second shot and the time reference point of said second instant provided by said time reference source;

the user superposes a second image generated by an image generator on the image of said second photograph, said second image being supplied at the request of the user, who may alter the position thereof as desired to make said second image similar to said image of said second photograph. Said second display value corresponding to said second image is determined and said second display value is stored in said memory in correlation with said second instant;

the time difference displayed between the second display value and the first display value is calculated;

the variation in rate of said experimental display is calculated, and said variation in rate is displayed on a viewing means.

Preferably, the memory only stores the first display value in correlation with said first instant on the one hand, and the second display value in correlation with the second instant on the other hand. It is not necessary to store associated images to implement the invention, in the simplest execution thereof described here, once an image corresponding to a particular display has been converted into a stored display value. Naturally, if the memory capacity allows and if the user finds this advantageous, the corresponding images may be stored and used.

In this basic version of the method according to the invention, the method is implemented with a device 1, preferably an integrated device, which includes:

a time reference source 3, formed by an internal time reference source, or by a receiving and processing means arranged to receive and process signals transmitted by an external time source 3A to permanently update a repeater clock 3 internal to device 1;

a calculating means 6 arranged to calculate time differences between display values, and/or between time reference points provided by said time reference source 3, and to calculate a variation in rate;

another data processing unit 7A arranged to store and process at least one variation in rate calculated by said calculating means 6, and/or viewing means 7 arranged to display at least one variation in rate calculated by said calculating means 6.

In a preferred implementation of the measuring method of the invention, since it is particularly economical, a mobile telephone or an iPhone® or a smartphone is used as device 1, coupled to an internal or external time reference source 3 and provided with a storage means 4 for storing images and/or display values corresponding to said images, and time reference points for the instants linked to said images, said time reference points being provided by the time reference source.

It is therefore possible, with a simple piece of equipment and at an affordable price, to carry out an Official Swiss Chronometer Test measurement (Contrôle Officiel Suisse des Chronomètres hereafter "COSC"). The method, in the most general case, consists in measuring the state of a mechanical watch by identifying the position of the hands at two moments, the time of which is very precisely known.

In a first implementation of the invention, the user needs simply to synchronise his watch with an application showing a watch dial on which he can position the virtual hands very accurately. The resolution of the software and display used for this application is at least as good as that of the watches to be evaluated. The object is to be able to correct the display on the screen until a perfect correlation is obtained with the mechanical watch whose rate is required to be measured. When this is achieved, an application of pressure to the screen precisely records the state of the watch and the time of the device, particularly a mobile telephone, iPhone® or smartphone. To determine the variation in rate, the operation has to be repeated a second time after a certain period of time. Since time measurement is very accurate in an iPhone® or a smartphone, the time difference between the two measurements and the two states of the watch is very accurately determined. It is therefore easy to accurately tell how fast or slow the watch is by comparison. To have a reliable measurement, it is possible to repeat the measurement as often as the user wishes. Moreover, so that the measurement is coherent, a minimum time interval must be set between two consecutive measurements.

In a second implementation of the invention, the user takes a photograph with the camera of the mobile telephone or iPhone® or smartphone. Next, the user superposes the virtual hands into a position matching the real time shown in the photograph. The operation simply has to be repeated a second time after a certain time period in order to determine the accuracy of the rate of the watch. The time reference for the period between two measurements is recorded at the same time as the photograph.

In these two implementations, it is also possible to follow the change in rate of each watch over time, which allows different watches to be compared at different times of the year or to observe any deterioration in a watch with time.

In a particular and particularly accurate implementation of the method:

one visual display from among those comprised in the timepiece is selected as the experimental display;

a first photograph is shot at a first instant with a means of shooting images, preferably a camera, coupled to an internal or external time reference source and provided with a storage means for storing a first image resulting from the first shot, which is processed, using an image analyser, to determine a first display value stored in a memory in correlation with the time reference point of said first instant provided by said time reference source;

after a determined time interval following said first shot, a second photograph is shot at a second instant on the same experimental display with the same camera coupled to the same time reference source and provided with the same storage means for storing a second image resulting from said second shot which is processed, using said image analyser, to determine a second display value stored in a memory in correlation with the time reference point of said second instant provided by said time reference source;

the time difference displayed between the second display value and the first display value is calculated, preferably with a calculating means;

the variation in rate of said experimental display is calculated, and the variation in rate is displayed on a viewing means.

To determine this variation in rate, preferably:

the real time difference between the time reference point of the second instant and the time reference point of the first instant is calculated;

the variation in rate between the displayed time difference and the real time difference is calculated;

accuracy is calculated as the ratio expressed for example in seconds per day, between the variation in rate as numerator and the real difference as denominator.

Preferably, to obtain high resolution as regards the accuracy of determination of the first display value and the second display value by the image analyser, the first instant is chosen so that, on the experimental display, the display of each of the time unit magnitudes is differentiated from the display of the other time unit magnitudes, so as to allow a properly differentiated image analysis for each time unit.

Figure 2:
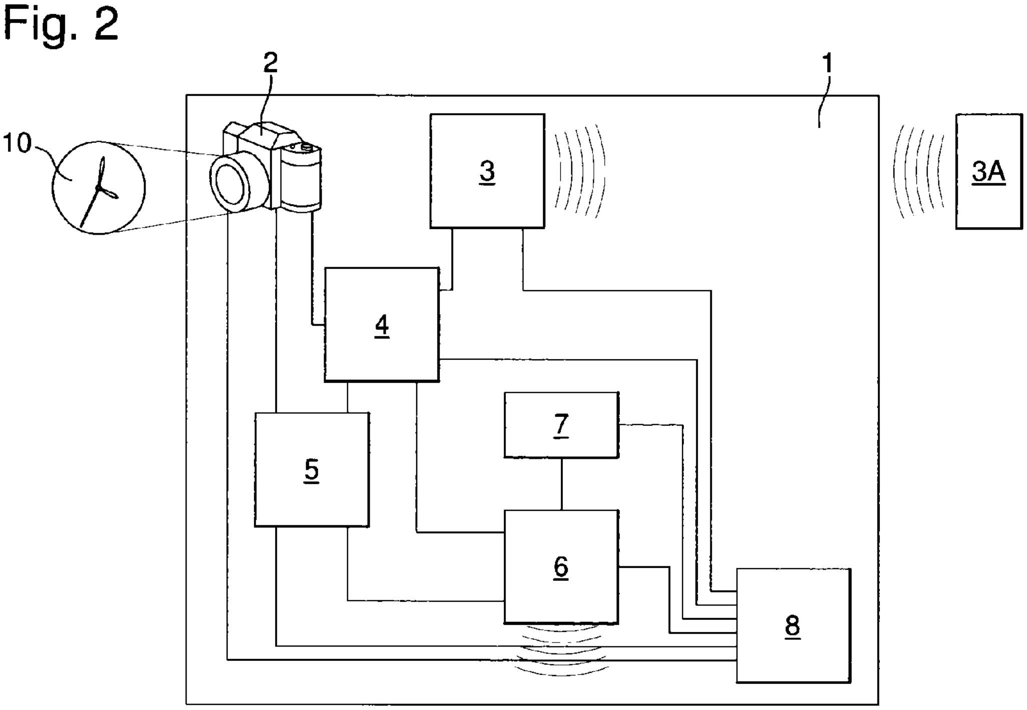
FIG. 2 shows a schematic view of a device for implementing the invention facing a timepiece at a second instant.

Likewise, it is advantageous to select a determined time interval so that the same is true at the second instant. In particular, when the experimental display is a display using hands, it is preferable to select very distinct angular positions for these hands so that they are properly differentiated, at the first instant and at the second instant, as seen in FIGS. 1 and 2.

To obtain a significant rate accuracy value, this determined time interval is preferably selected in a ratio of at least a thousand to one relative to the display step of the smallest time value visible on the experimental display. Naturally, it is also possible, especially for observation over a long period, of around a day, to choose a much higher factor, higher than or equal to 10,000 for example.

In a preferred application, this determined time interval is selected to be greater than or equal to a half day, or greater than or equal to one day, so as to obtain values comparable to those provided by the Swiss Chronometry Office. The choice of an exact multiple of twelve hours generally allows the display to return, in the final position, to a position comparable to the initial position.

However, the method may still be applied, with very satisfactory results compared to the prior art, for much shorter durations, of around a minute or an hour, for example.

To smooth out the influence of external parameters, a series of cycles can thus be performed:

generally, a series of cycles is performed of storing a first display value stored in a memory in correlation with said first instant, and a second display value stored in said memory in correlation with said second instant, and the results of the calculations of the displayed difference, real difference, variation in rate and accuracy are stored, and a mean accuracy is calculated;

if images are shot, a series of cycles of first shots and second shots is performed, and the results of the calculations of the displayed difference, real difference, variation in rate and accuracy are stored, to calculate a mean accuracy, either by averaging the accuracy values, or by the ratio of the accumulated variation in rate to the accumulated time difference.

In production, it is advantageous to apply the method to a plurality of timepieces. Each cycle of storing a first display value stored in a memory in correlation with said first instant and a second display value stored in said memory in correlation with said second instant, is performed on each timepiece in the same conditions. The accuracy of each timepiece is calculated and, in the case where photographs are shot, the photographs are shot in the same conditions and the accuracy of each timepiece is calculated, which then allows the accuracy of the various timepieces to be compared and the timepieces to be classified in various accuracy categories.

In an advantageous variant implementation of the method according to the invention, the method is applied to a plurality of timepieces, wherein shots are taken at the same time and in the same conditions. The accuracy of each timepiece is calculated using an image discrimination means to process the shots of each timepiece independently of each other, and using a means of controlling the image analysis means and calculating means, said controlling means being arranged to allocate the results of the variation in rate calculation to each of the timepieces.

In this case, it is useful for a standard-watch or standard-clock to be selected as one of the timepieces.

Figure 3:
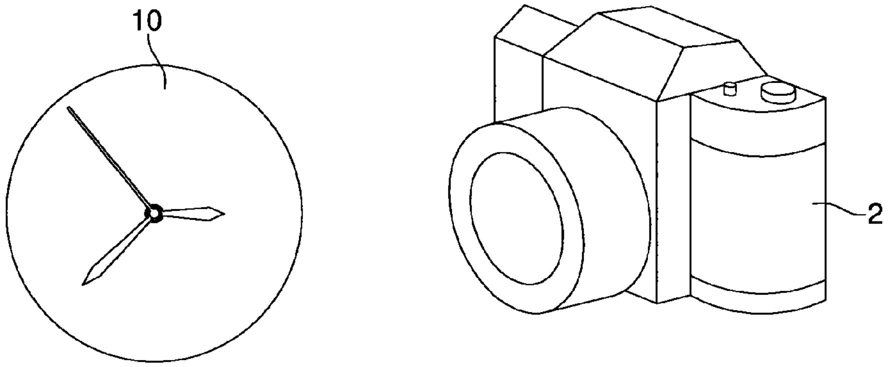
FIGS. 3 and 4 show a partial schematic view of a camera which forms part of a device for implementing the invention, facing a timepiece respectively at a first instant and at a second instant staggered by a multiple of twelve hours.
Figure 4:
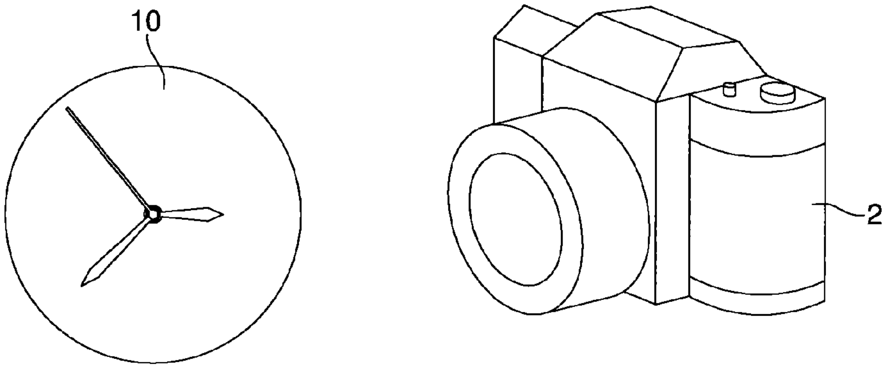

In an alternative of this measuring method:

the second shot is extended by a video shot using the same camera coupled to the same time reference source, which is coupled to the image analyser to stop the shot when the analyser perceives an image, as seen in FIG. 4, identical to that which it perceived at the first instant shown in FIG. 3;

a third instant is stored corresponding to the moment at which the image analyser stops the shot, and the time reference point of the third instant supplied by the time reference source;

a periodic difference between the time reference point of the third instant and the time reference point of the first instant is calculated;

a variation in period is calculated between the periodic difference and a theoretical period at which the display is assumed to return to the same position;

accuracy is calculated as the ratio between the variation in period and the theoretical period.

It is clear that, in this advantageous variant of the method of the invention, the determined time interval, after which the second image is taken at the second instant, is a minimum time interval determined by the user, according to his desired experiment duration, for example one day.

In another variant, all of the shots are taken in the form of a video, the first instant is determined on the fly, randomly, or semi-randomly to check that the display indicators, in particular hands, are clearly visible, and the second instant is determined by the image analyser as soon as it detects a new image identical to that stored at the first instant.

In yet another variant of the video version, the image analyser is controlled by a control system, which allows identical images to that of the first instant to pass several times and adds up the number of such passages. It is therefore possible to perform the analysis over a substantially longer duration, for example over the entire power reserve of the timepiece. It is also possible, and advantageous, for the analyses to be performed one after the other, to determine the influence of the letting down of the barrel on the variation in rate of the timepiece.

In a preferred implementation of the measuring method according to the invention, since it is particularly economical, a mobile telephone or an iPhone, or smartphone is chosen and used as the camera, coupled to an internal or external time reference source and provided with a storage means for storing images resulting from the shots and/or display values corresponding to these images, and the time reference points of the instants at which the shots are taken, said time reference points being provided by the time reference source.

According to this measuring method, a source internal to the analysing device, such as a clock, or an external time source transmitting a periodic or GPS or radio signal or similar, is chosen and used as the time reference source.

The invention also concerns a device 1 for implementing the method, which includes:

a means 2 of shooting photographs and/or videos of a timepiece 10;

a reference time source 3, formed by an internal reference time source, as seen in FIG. 1, or by a receiving and processing means arranged to receive and process signals transmitted by an external time source 3A, as seen in FIG. 2, to permanently update a repeater clock 3 internal to the device;

the means 2 of shooting photographs and/or video being coupled to the reference time source 3;

a storage means 4 for storing images resulting from the shots and/or display values corresponding to said images, and the time reference points of the instants at which the shots are taken, the time reference points being supplied by the time reference source 3;

an image analysis hardware and/or software means 5;

the position in space of visible indicators in each shot taken;

and/or a time display value in each shot taken;

a calculating means 6 arranged to calculate time differences between the display values supplied by image analysis means 5 and/or between the time reference points supplied by time reference source 3, and to calculate a variation in rate;

and, to utilise the results, another data processing unit 7A shown in FIG. 1, arranged to store and process at least one variation in rate calculated by the calculating means, in general external to device 1, and/or viewing means 7, preferably incorporated in device 1 as shown in FIG. 2, arranged to display at least one variation in rate calculated by the calculating means.

In particular, image analysis means 5 must include the hardware and/or software modules for interpreting the display of each timepiece concerned. Indeed, if image analysis means 5 is preferably dedicated to a conventional configuration of a timepiece 10 with three hands at the centre of the dial, it must be able to process the case of off-centre displays, retrograde or jumping displays, digital or other displays. Consequently, if the invention is preferably devised for checking mechanical timepieces, it is applicable to any type of timepiece comprising a visual display.

Image analysis means 5 further advantageously includes means arranged to take account of the geometrical position of the display means of timepiece 10.

Preferably, device 1 includes a control means 7 arranged to coordinate, with reference to the time reference source 3, the processing and analysis of shooting means 2, storage means 4, image analysis means 5, calculating means 6, to deliver to signalling means 7 and/or to another data processing unit 7A, a variation in rate calculated by calculating means 6.

For a particular application concerning the simultaneous observation of several timepieces, device 1 includes an image discrimination means, preferably integrated in image analysis means 5 and/or in calculating means 6, for processing the shots taken simultaneously of several timepieces independently of each other, and it includes a means 8 of controlling image analysis means 5 and calculating means 6, said control means 8 being arranged to allocate the results of the variation in rate calculation to each of the timepieces. Naturally, in this case, image analysis means 5 must comprise the hardware and/or software modules for interpreting the display of each of the timepieces.

In a preferred application, time reference source 3 includes a receiving and processing means arranged to receive and process signals transmitted by an external time source 3A to permanently update a clock relay internal to the device, the external time reference source 3A being formed by a GPS signal transmitter network, or by a telephone network delivering a periodic signal, or by a mother clock transmitting a hertz or radio signal.

Preferably, this device 1 is formed by a mobile telephone or iPhone or smartphone coupled to this type of internal or external time reference source 3.

In short, the system proposed is equivalent to a COSC type measurement. It consists, in its most common application, in measuring the state of a mechanical watch by identifying the position of the seconds hand at two moments, the time of which is known or can be determined very accurately. It uses the telephone camera to take a picture of the dial while storing the time at which the picture is taken. Accuracy over time is influenced by the fitting time and number of vibrations of the movement. Using visual recognition software, the position of the seconds hand, and that of the other hands if necessary, is determined with a high level of accuracy, typically around 0.1 seconds and thus the state of the watch is determined to within more than ±0.5 seconds. Given that a mobile telephone or iPhone or smartphone has access to very accurate time references, such as that provided by GPS, accuracy over the time interval between two pictures is determined by the accuracy of the shot. Assuming for example that the user photographs his watch at an interval of 1 day, he can therefore measure the rate of his watch with an accuracy of within less than 1 second per day.

The invention therefore provides the user with the possibility of measuring the accuracy of his mechanical watch by using his mobile telephone or iPhone or a smartphone, by taking two photographs of his watch dial at a time interval of around a day. The image analysis means includes analysis software, which thus visually recognises the position of the seconds hand and deduces therefrom the mean rate of the watch, with, as time reference, an accurate clock, such as for example that provided by the GPS signal.

With higher resolution means than that of a mobile telephone, the invention also allows the manufacturer to categorise production quickly and very economically.

The invention claimed is:

1. A method of measuring accuracy of at least one timepiece that is a mechanical watch, including at least one visual display device, and where one of said at least one visual display device of said timepiece is selected as an experimental display, the method comprising:—a first measured instant, at which said experimental display is in a first display position corresponding to a first image generated by an image generator coupled to an internal or external time reference source, said first image being supplied at a request of a user, is stored with said corresponding internal or external time reference source, said first display position is synchronized, in optical comparison to a time display position of said timepiece with said first image, the user alters the position of said first image as desired to synchronize said first image with a real timepiece display, a first display value, corresponding to said first image, is determined and said first display value is stored in a storage device in correlation with said first instant;—after a determined time interval following said first instant, a second measured instant, at which said experimental display is in a second display position corresponding to a second image, said second image being generated by said same image generator, said second image being supplied at the request of the user, is stored with said corresponding time reference source said second display position is synchronized, in optical comparison to the time display position of said timepiece with said second image, the user alters the position of said second image as desired to synchronize said second image with said real timepiece display a second display value, corresponding to said second image, is determined and said second display value is stored in said storage device in correlation with said second instant;—a time difference displayed between said second display value and said first display value is calculated; and—a variation in rate of said experimental display is calculated, and said variation in rate is displayed on a viewing device.

2. A method of measuring the accuracy of at least one timepiece that is a mechanical watch, including at least one visual display device, where one of said at least one visual display device of said timepiece is selected as an experimental display, the method comprising:—a first photographed image of said experimental display is shot at a first instant with a camera coupled to an internal or external time reference source and provided with a storage device to store the first photographed image resulting from a first shot and a time reference point of said first instant provided by said time reference source, at which a first measured instant said experimental display is in a first display position corresponding to said first photographed image, is stored with a corresponding internal or external time reference source, and the time reference point of said first instant provided by said time reference source is stored in said storage device;—a user superposes a first built image generated by an image generator on the image of said first photograph, said first built image being built by the user, who changes a position thereof as desired to make said first built image similar to said first photographed image, a first display value corresponding to said first built image is determined and the first display value is stored in said storage device in correlation with said first instant;—after a determined time interval following said first shot, a second photographed image is shot at a second instant on the same said experimental display with the same camera coupled to the same time reference source and provided with the same storage device to store the second photographed image resulting from a second shot and a time reference point of said second instant provided by said time reference source, at which a second measured instant said experimental display is in a second display position corresponding to said second photographed image, is stored with a corresponding internal or external time reference source, and the time reference point of said second instant provided by said time reference source is stored in said storage device;—the user superposes a second built image generated by said image generator on the said second photographed image, said second built image being built by the user, who alters a position thereof as desired to make said second built image similar to said second photographed image a second display value corresponding to said second built image is determined and said second display value is stored in said storage device in correlation with said second instant a time difference displayed between said second display value and said first display value is calculated;—a variation in rate of said experimental display is calculated, and said variation in rate is displayed on a viewing device.

3. The measuring method according to claim 1, wherein:—one of said at least one visual display device of said timepiece is selected as the experimental display;—a first photograph is shot at a first instant with a camera, coupled to the internal or external time reference source and provided with the storage device to store a first image resulting from a first shot, which is processed, using an image analyzer to determine a first display value stored in the storage device in correlation with a time reference point of said first instant provided by said time reference source;—after a determined time interval following said first shot, a second photograph is shot at a second instant on the same experimental display with the same camera coupled to the same time reference source and provided with the same storage device to store a second image resulting from a second shot which is processed, using said image analyzer, to determine a second display value stored in the storage device in correlation with a time reference point of said second instant provided by said time reference source;—a time difference displayed between said second display value and said first display value is calculated;—and a variation in rate of said experimental display is calculated, and said variation in rate is displayed on the viewing device.

4. The measuring method according to claim 1, wherein:—a series of cycles is performed of storing the first display value stored in the storage device in correlation with said first instant, and the second display value stored in said storage device in correlation with said second instant, and the results of calculations of the displayed difference, real difference, variation in rate and accuracy are stored, and a mean accuracy is calculated.

5. The measuring method according to claim 2, wherein:—a series of cycles is performed of storing the first display value stored in the storage device in correlation with said first instant, and a second display value stored in said storage device in correlation with said second instant, and results of calculations of the displayed difference, real difference, variation in rate and accuracy are stored, and a mean accuracy is calculated.

6. The measuring method according to claim 3, wherein:—a series of cycles is performed of storing the first display value stored in the storage device in correlation with said first instant, and the second display value stored in said storage device in correlation with said second instant, and results of calculations of the displayed difference, real difference, variation in rate and accuracy are stored, and a mean accuracy is calculated.

7. The measuring method according to claim 1, wherein:—the method is applied to a plurality of timepieces, wherein each cycle of storing the first display value stored in the storage device in correlation with said first instant, and the second display value stored in said storage device in correlation with said second instant, is performed on each timepiece in the same conditions, and wherein the accuracy of each timepiece is calculated, and—the accuracy of said timepieces is compared in order to classify said timepieces into different accuracy categories.

8. The measuring method according to claim 2, wherein:—the method is applied to a plurality of timepieces, wherein each cycle of storing the first display value stored in the storage device in correlation with said first instant, and the second display value stored in said storage device in correlation with said second instant, is performed on each timepiece in the same conditions, and wherein the accuracy of each timepiece is calculated, and—the accuracy of said timepieces is compared in order to classify said timepieces into different accuracy categories.

9. The measuring method according to claim 3, wherein:—the method is applied to a plurality of timepieces, wherein each cycle of storing the first display value stored in the storage device in correlation with said first instant, and the second display value stored in said storage device in correlation with said second instant, is performed on each timepiece in the same conditions, and wherein the accuracy of each timepiece is calculated, and—the accuracy of said timepieces is compared in order to classify said timepieces into different accuracy categories.

10. The measuring method according to claim 3, wherein:—the method is applied to a plurality of timepieces, wherein shots are taken of the timepieces at the same time and in the same conditions and wherein the accuracy of each timepiece is calculated using an image discrimination device to process the shots of each timepiece independently of the other, and using a controller of the image analyzer and a calculating device, said controller being arranged to allocate results of the variation in rate calculation to each of said timepieces.

11. The measuring method according to claim 3, wherein:—said second shot is extended by a video shot using the same camera coupled to the same time reference source, which is coupled to the image analyzer to stop the shot when the analyzer perceives an image identical to that perceived at said first instant;—a third instant is stored corresponding to the instant at which the image analyzer stops the shot, and the time reference point of said third instant supplied by said time reference source;—a periodic difference between the said reference point of said third instant and said time reference point of said first instant is calculated; a variation in period is calculated between said periodic difference and a theoretical period at which the display is assumed to return to the same position; and—accuracy is calculated as a ratio between said variation in period and said theoretical period.

12. The measuring method according to claim 5, wherein:—a mobile telephone or an iPhone® or a smartphone is used as said camera, coupled to the internal or external time reference source and provided with the storage device to store images resulting from at least one of shots and display values corresponding to said images, and time reference points of instants at which said shots are taken, said time reference points being provided by said time reference source.

13. The measuring method according to claim 3, wherein:—a mobile telephone or an iPhone® or a smartphone is used as said camera, coupled to the internal or external time reference source and provided with the storage device to store images resulting from at least one of shots and display values corresponding to said images, and time reference points of instants at which said shots are taken, said time reference points being provided by said time reference source.

14. The measuring method according to claim 2, wherein:—an external time source transmitting a periodic signal or a GPS signal is used as said time reference source.

* * * * *